(12) United States Patent
Jeon et al.

(10) Patent No.: US 10,098,094 B2
(45) Date of Patent: *Oct. 9, 2018

(54) TRANSMISSION METHOD AND APPARATUS IN A WIRELESS COMMUNICATION SYSTEM IN WHICH A CELL INCLUDES A PLURALITY OF SUBCELLS

(71) Applicant: Samsung Electronics Co., Ltd., Gyeonggi-do (KR)

(72) Inventors: Joseph Jeon, Gyeonggi-do (KR);
Jee-Woong Kang, Seoul (KR);
Ho-Joong Kwon, Gyeonggi-do (KR);
Eun-Yong Kim, Gyeonggi-do (RE);
June Moon, Gyeonggi-do (KR);
Sung-Woo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/473,766

(22) Filed: Mar. 30, 2017

(65) Prior Publication Data
US 2017/0208578 A1    Jul. 20, 2017

Related U.S. Application Data

(63) Continuation of application No. 13/907,101, filed on May 31, 2013, now Pat. No. 9,642,120.

(30) Foreign Application Priority Data

May 31, 2012   (KR) ........................ 10-2012-0058733

(51) Int. Cl.
*H04L 12/28*      (2006.01)
*H04W 72/04*      (2009.01)
(Continued)

(52) U.S. Cl.
CPC ........ *H04W 72/0406* (2013.01); *H04B 7/024* (2013.01); *H04B 7/0473* (2013.01);
(Continued)

(58) Field of Classification Search
USPC ................................. 370/252, 278, 329, 386
See application file for complete search history.

(56) References Cited

U.S. PATENT DOCUMENTS

2010/0118989 A1* 5/2010 Sayana ................. H04L 5/0035
375/260
2012/0170516 A1 7/2012 Noh
(Continued)

FOREIGN PATENT DOCUMENTS

KR       1020130084108        7/2013

*Primary Examiner* — John Pezzlo
(74) *Attorney, Agent, or Firm* — The Farrell Law Firm, P.C.

(57) ABSTRACT

A transmission method and apparatus are provided for use in a wireless communication system in which a cell includes a plurality of sub-cells. A Transmission Point (TP) in the wireless communication system includes a transmitter configured to transmit a signal to each of the plurality of sub-cells through a plurality of antennas; a receiver configured to receive uplink control information from a User Equipment (UE) located within at least one of the plurality of sub-cells; and a controller configured to determine a virtual matrix for each of the plurality of sub-cells, to select a precoding matrix according to the virtual matrices of the plurality of sub-cells, to determine a cooperative transmission mode or a normal transmission mode, based on the received uplink control information, and to control the transmitter to perform downlink transmission on a sub-cell basis through the virtual matrices of the sub-cells according to the determined transmission mode.

12 Claims, 5 Drawing Sheets

(51) Int. Cl.
    *H04B 7/024*     (2017.01)
    *H04B 7/0456*     (2017.01)
    *H04L 25/03*     (2006.01)
    *H04L 5/00*     (2006.01)
    *H04J 1/16*     (2006.01)
    *H04W 88/02*     (2009.01)

(52) U.S. Cl.
    CPC ............ *H04L 5/005* (2013.01); *H04L 5/0035* (2013.01); *H04L 5/0057* (2013.01); *H04L 5/0073* (2013.01); *H04L 25/03949* (2013.01); *H04W 88/02* (2013.01)

(56) References Cited

U.S. PATENT DOCUMENTS

| | | | |
|---|---|---|---|
| 2012/0184322 A1 | 7/2012 | Falconetti | |
| 2012/0189077 A1 | 7/2012 | Seo | |
| 2013/0039326 A1* | 2/2013 | Kim | ............... H04B 7/024 |
| | | | 370/329 |
| 2013/0083681 A1* | 4/2013 | Ebrahimi Tazeh Mahalleh | .......... |
| | | | H04L 5/0057 |
| | | | 370/252 |
| 2013/0176979 A1* | 7/2013 | Ohwatari | ............ H04W 72/046 |
| | | | 370/329 |
| 2014/0357286 A1 | 12/2014 | Jean et al. | |

\* cited by examiner

TRANSMISSION METHOD AND APPARATUS IN A WIRELESS COMMUNICATION SYSTEM IN WHICH A CELL INCLUDES A PLURALITY OF SUBCELLS

PRIORITY

This application is a Continuation Application of U.S. patent application Ser. No. 13/907,101, which was filed on May 31, 2013, and claims priority under 35 U.S.C. § 119(a) to Korean Patent Application Serial No. 10-2012-0058733, which was filed in the Korean Intellectual Property Office on May 31, 2012, the content of each of which is incorporated herein by reference.

BACKGROUND OF THE INVENTION

1. Field of the Invention

The present invention relates generally to DownLink (DL) communication in a multi-cellular wireless communication system.

2. Description of the Related Art

Future-generation mobile communication and wireless communication systems require higher data rates and an increased system capacity in a multi-cellular environment having a plurality of sub-cells that share a control channel. As a result, research has been conducted on different Multiple Input Multiple Output (MIMO) systems that transmit data through a plurality of antennas.

Among the MIMO systems, a closed-loop MIMO system increases a data rate and transmission performance using channel state information in the multi-cellular environment having a plurality of sub-cells that share a control channel. In the closed-loop MIMO system, a Base Station (BS) receives, as feedback information, UpLink (UL) control information about a DL transmission channel from a User Equipment (UE) that the BS is to service. For example, the feedback information about the DL transmission channel includes a Channel Quality Indicator (CQI), a Precoding Matrix Index (PMI), etc. Thereafter, the BS transmits data to the UE based on the UL control information.

Although the closed-loop MIMO system is being studied and used for a multi-cellular environment and a single-cellular environment, studies and developments are needed for a technique that mitigates interference from other cells, when the closed-loop MIMO system is used in a multi-cellular environment.

In the multi-cellular environment, the same cell IDentifier (ID) is assigned to each sub-cell, irrespective of the number of transmission antennas. If cells are densely populated, due to an increase of an amount of data, inter-cell interference increases and network geometry gets complicated. Further, the overhead of inter-cell handover reduces performance.

SUMMARY OF THE INVENTION

Embodiments of the present invention are designed to address at least the above-mentioned problems and/or disadvantages occurring in the related art and to provide at least the advantages described below.

Accordingly, an aspect of the present invention is to provide a DL communication method in a wireless communication system in which a cell includes a plurality of sub-cells sharing a control channel.

Another aspect of the present invention is to provide a method for mapping antennas on a sub-cell basis in order to minimize inter-cell interference and increase data transmission efficiency in a wireless communication system.

In accordance with an aspect of the present invention, a Transmission Point (TP) in a wireless communication system in which a cell includes a plurality of sub-cells is provided. The TP includes a transmitter configured to transmit a signal to each of the plurality of sub-cells through a plurality of antennas; a receiver configured to receive uplink control information from a User Equipment (UE) located within at least one of the plurality of sub-cells; and a controller configured to determine a virtual matrix for each of the plurality of sub-cells, to select a precoding matrix according to the virtual matrices of the plurality of sub-cells, to determine a transmission mode from among a plurality of available transmission modes, based on the received uplink control information, and to control the transmitter to perform downlink transmission on a sub-cell basis through the virtual matrices of the sub-cells according to the determined transmission mode. The plurality of available transmission modes includes (1) a cooperative transmission mode in which at least one neighbor sub-cell transmits a downlink signal in same frequency resources to the UE, wherein a difference between strengths of a signal received from a serving sub-cell and a signal received from the at least one sub-cell at the UE is less than or equal to a threshold, and (2) a normal transmission mode in which only the serving sub-cell transmits a signal to the UE.

In accordance with another aspect of the present invention, a transmission method of a TP in a wireless communication system in which a cell includes a plurality of sub-cells is provided. The method includes receiving uplink control information from a User Equipment (UE) located within at least one of the plurality of sub-cells; determining a virtual matrix for each of the plurality of sub-cells; selecting a precoding matrix according to the virtual matrices of the plurality of sub-cells; determining a transmission mode from among a plurality of available transmission modes, based on the received uplink control information; and transmitting signals to the plurality of sub-cells on a sub-cell basis through the virtual matrices of the sub-cells according to the determined transmission mode. The plurality of available transmission modes includes (1) a cooperative transmission mode in which at least one neighbor sub-cell transmits a downlink signal in same frequency resources to the UE, wherein a difference between strengths of a signal received from a serving sub-cell and a signal received from the at least one sub-cell at the UE is less than or equal to a threshold, and (2) a normal transmission mode in which only the serving sub-cell transmits a signal to the UE.

In accordance with another aspect of the present invention, a UE located in at least one of a plurality of sub-cells in a wireless communication system in which a cell includes the plurality of sub-cells is provided. The UE includes a transmitter configured to transmit uplink control information; and a receiver configured to receive a signal through a virtual matrix corresponding to a sub-cell, according to a transmission mode determined from among a plurality of available transmission modes, based on the uplink control information. The plurality of available transmission modes transmission mode includes (1) a cooperative transmission mode in which at least one neighbor sub-cell transmits a downlink signal in the same frequency resources to the UE, wherein a difference between strengths of a signal received from a serving sub-cell and a signal received from the at least one sub-cell at the UE is less than or equal to a threshold, and (2) a normal transmission mode in which only the serving sub-cell transmits a signal to the UE.

In accordance with another aspect of the present invention, a method of receiving a signal by a UE from a sub-cell from among a plurality of sub-cells in a wireless communication system in which a cell includes the plurality of sub-cells is provided. The method includes transmitting, by the UE, uplink control information; and receiving a signal through a virtual matrix corresponding to the sub-cell according to a transmission mode from among a plurality of available transmission modes, determined based on the uplink control information. The plurality of available transmission modes transmission mode includes (1) a cooperative transmission mode in which at least one neighbor sub-cell transmits a downlink signal in the same frequency resources to the UE, wherein a difference between strengths of a signal received from a serving sub-cell and a signal received from the at least one sub-cell at the UE is less than or equal to a threshold, and (2) a normal transmission mode in which only the serving sub-cell transmits a signal to the UE.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
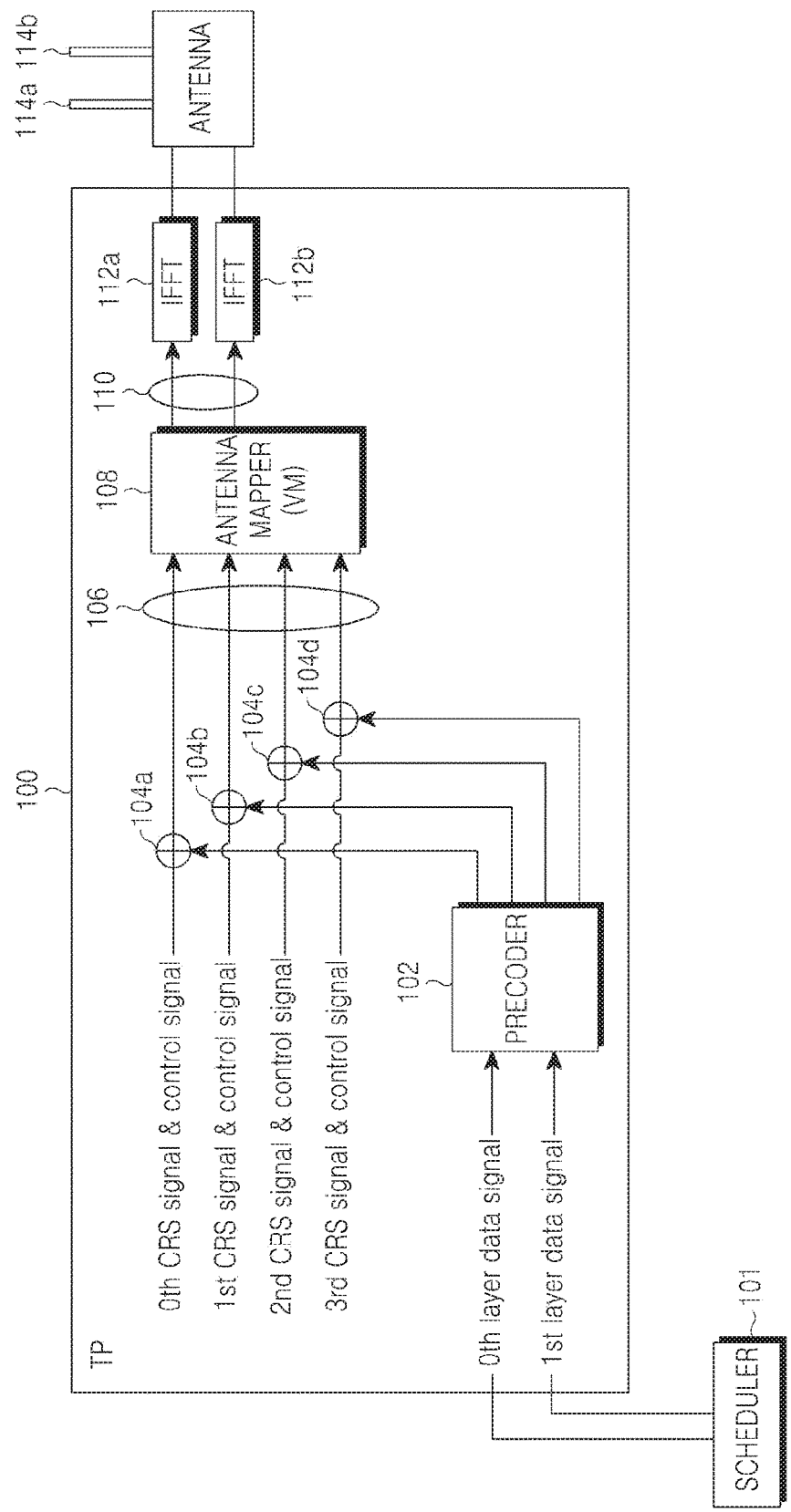
FIG. 1 illustrates a TP according to an embodiment of the present invention.

FIG. 1 illustrates a TP according to an embodiment of the present invention. Specifically, FIG. 1 illustrates a TP 100 deployed in a multi-cellular wireless communication system.

Referring to FIG. 1, the TP 100 is a transmitter of a sub-cell, and includes a scheduler 101, a precoder 102, adders 104a, 104b, 104c, and 104d, an antenna mapper 108, Inverse Fast Fourier Transform (IFFT) processors 112a and 112b, and antennas 114a and 114b.

Because the same cell ID is assigned to a plurality of sub-cells forming a cell, the TP 100 should have knowledge of a control channel shared among the sub-cells and a DL Reference Signal (RS) used for channel estimation. The same or different DL RSs may be configured for different sub-cells. For example, the TP 100 transmits a Common Reference Signal (CRS) through each of four logical antenna ports.

The scheduler 101 receives information about a Virtual Matrix (VM) determined for each sub-cell from a higher layer and controls the antenna mapper 108 to operate according to a VM indicated by the received information. The scheduler 101 determines a Precoding Matrix (PM) based on the VMs of the sub-cells in a predetermined scheme and controls the precoder 102 to operate according to the determined PM. The scheduler 101 also determines a transmission mode for a UE, i.e., selects an antenna to transmit data to the UE from among antennas connected for the sub-cells, based on the VMs of the sub-cells and the signal strengths of the sub-cells received from UEs.

The precoder 102 uses the determined PM, under the control of the scheduler 101. For example, if the precoder 102 includes two input ports and receives two different data signals, i.e., a $0^{th}$ layer data signal and a $1^{st}$ layer data signal, through the two input ports, the precoder 102 multiplies the two data signals by the PM selected by the scheduler 101 and provides the precoded signals to CRS ports 106. The UE may identify data output through antennas selected on a sub-cell basis by the PM. For example, because the precoder 102 includes two input ports and four output ports, the PM is a 4×2 matrix. The precoder 102 also outputs the products of the two different data signals and the predefined PM to the adders 104a, 104b, 104c, and 104d, mapped one-to-one to the CRS ports 106.

The adders 104a, 104b, 104c, and 104d add the signals received from the precoder 102 to CRSs and control signals, and output the sums to the respective CRS ports 106. Because the CRS ports 106 are connected to the output ends of the precoder 102, the CRS ports 106 may be regarded as logical antenna ports.

The antenna mapper 108 mixes the received CRSs and control signals to be shared among the sub-cells, and multiplies the mixed signal by a VM corresponding to the sub-cell received from the scheduler 101. Specifically, the antenna mapper 108 multiplies the CRSs and control signals received through the four CRS ports 106 by the VM. The VM mixes the signals received through the respective CRS ports 106 and distributes the mixed signal with the same power.

Therefore, the antenna mapper 108 generates two output signals having the same strength and phase by multiplying the CRS signals received through the CRS ports 106 by the VM. Thereafter, the antenna mapper 108 transmits the same output signals in antenna paths 110 connected the two physical antennas 114a and 114b. The antenna mapper 108 also generates two control signals having the same strength and phase by mixing the received control signals, and outputs the two control signals in the two antenna paths 110, like the CRS signals.

The antenna paths 110 are connected to the two antennas 114a and 114b through the IFFT processors 112a and 112b.

The antenna mapper 108 uses the VM to map the input signals to the output antenna paths. According to an embodiment of the present invention, the same or different VMs may be assigned to the sub-cells (i.e., sectors) of a cell of a BS.

For example, in FIG. 1, because the antenna mapper 108 has four input ports and two output ports, the VM is a 2×4 matrix. The higher layer determines a VM for each sub-cell and provides the determined VM to the antenna mapper 108. The VM will be described later in more detail.

Each of the signals output from the logical antenna ports 106 is transmitted to the UE through the IFFT processor 112a or 112b connected to an antenna port and the antenna 114a or 114b connected to the IFFT processor 112a or 112b.

Although FIG. 1 illustrates a configuration of a TP for one sub-cell, because the present invention is implemented in a multi-cellular environment, the configuration of the TP can be extended to each of sub-cells that form a cell.

Figure 2:
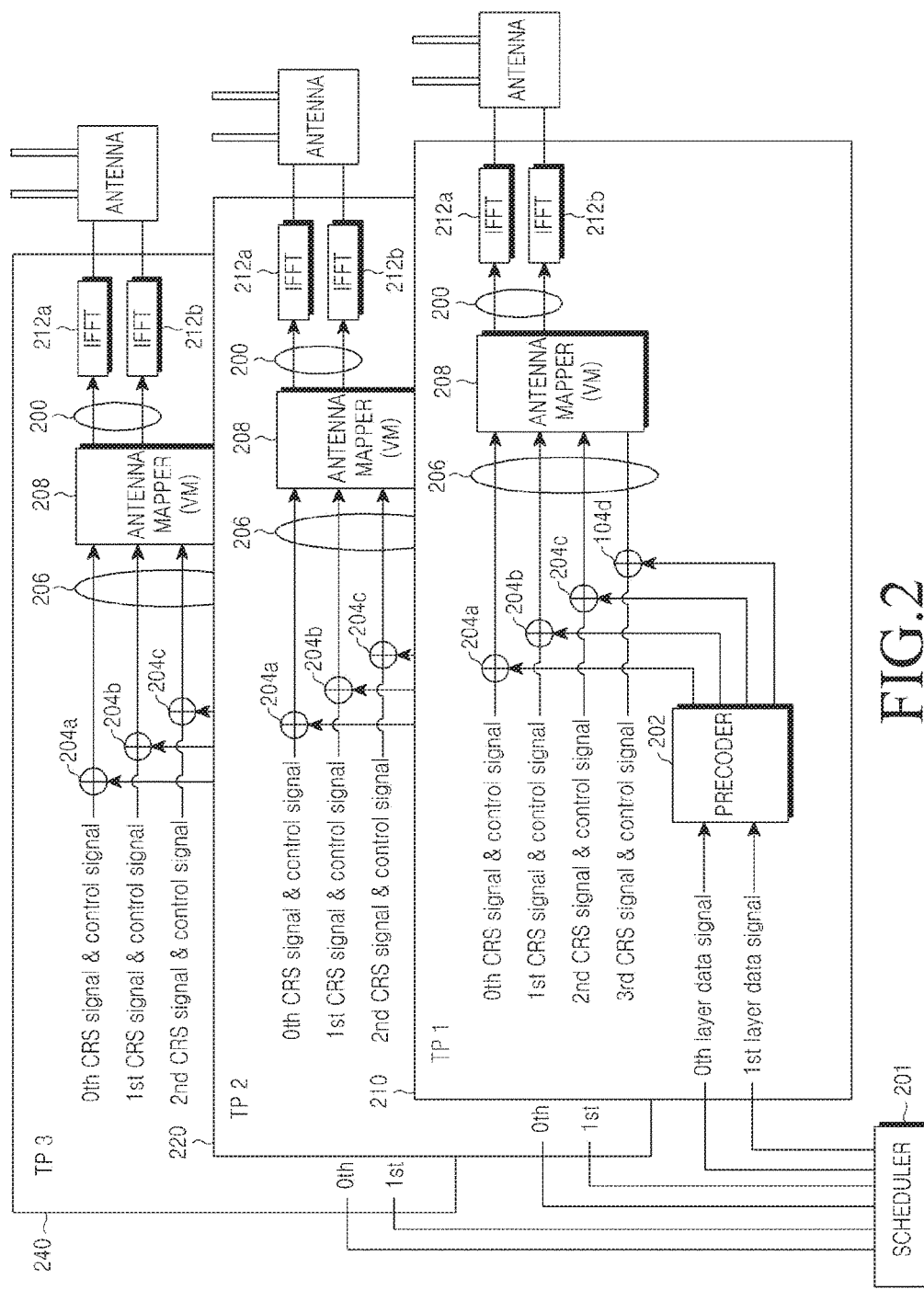
FIG. 2 illustrates TPs in a wireless communication system in which a cell includes three sub-cells, according to an embodiment of the present invention.

FIG. 2 illustrates TPs in a wireless communication system in which a cell includes three sub-cells, according to an embodiment of the present invention. Specifically, FIG. 2 illustrates that two physical antennas are connected in each sub-cell.

Referring to FIG. 2, TPs 200, 220, and 240 (TP1, TP2, and TP3) are mapped to three sub-cells. Each of TP1, TP2 and TP3 has the same configuration as that of TP 100 as illustrated in FIG. 1. Accordingly, each of TP1, TP2, and TP3 includes a precoder 202, adders 204a, 204b, 204c, and 204d, an antenna mapper 208, IFFT processors 212a and 212b, and antennas. Similar to FIG. 1, reference numerals 206 and 200 denote CRS ports and antenna paths, respectively.

While TP1, TP2 and TP3 are illustrated in FIG. 2 as being individually configured on a sub-cell basis, TP1, TP2, and TP3 have the same units up to the front ends of their antennas and each TP is connected to physical antennas preset for a sub-cell mapped to the TP in real implementation. For example, each of TP1, TP2, and TP3 includes two physical antennas. Alternatively, each of TP1, TP2, and TP3 may include two or more physical antennas.

Further, the antenna mappers 208 of TP1, TP2, and TP3 mapped to their respective sub-cells may use the same or different VMs.

After antennas to be connected are determined on a sub-cell basis, a transmission mode is determined based on the VMs of the sub-cells and the strengths of radio signals received at a UE from the antennas connected to the sub-cells. For example, a cooperative transmission mode and a normal transmission mode are available as transmission modes.

Figure 3:
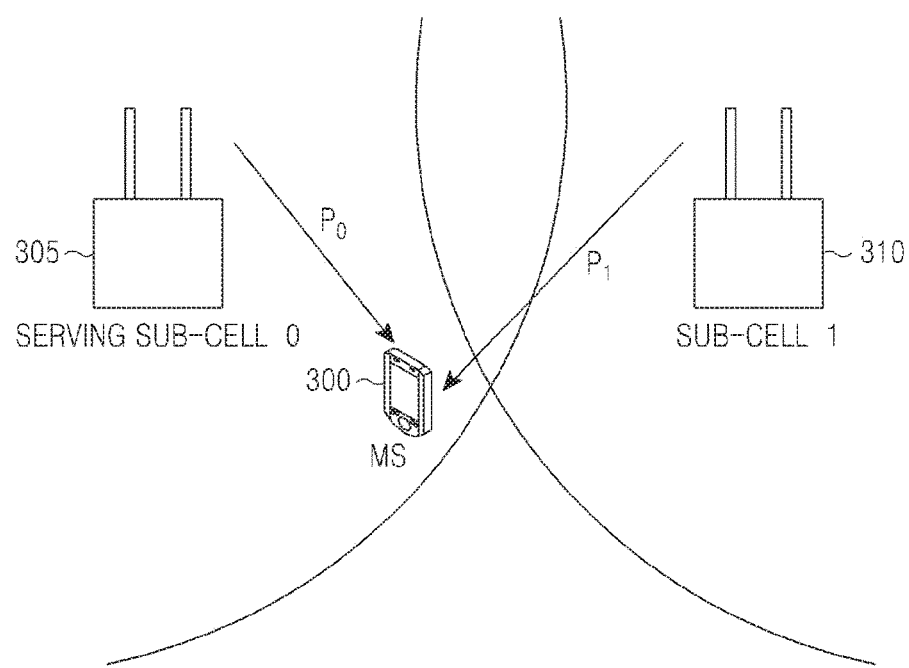
FIG. 3 illustrates a UE measuring received signal strengths of two sub-cells according to an embodiment of the present invention.

FIG. 3 illustrates a UE measuring received signal strengths of two sub-cells, according to an embodiment of the present invention.

Referring to FIG. 3, if a serving sub-cell 305 (serving sub-cell 0) and a sub-cell 310 (sub-cell 1) transmit the same signals through the CRS ports 206, the antenna mappers 208, and the antennas, a UE (or Mobile Station (MS)) 300 measures the strengths of signals received from serving sub-cell 0 and sub-cell 1, and reports the signal strength measurements $P_0$ and $P_1$ to a BS (not shown). A scheduler of the BS compares the difference between the signal strength measurements $P_0$ and $P_1$ with a threshold $P_{th}$ using Equation (1).

$$P_0 - P_1 \leq P_{th} \quad (1)$$

In Equation (1), $P_{th}$ is a threshold representing a signal strength difference at which data pollution occurs.

If the difference between the signal strength measurements $P_0$ and $P_1$ is less than or equal to the threshold $P_{th}$, the scheduler sets a transmission mode for the UE 300 to the cooperative transmission mode. Thereafter, all sub-cells that satisfy the condition expressed as Equation (1), except for the serving sub-cell of the UE 300 are selected as cooperative sub-cells for the cooperative transmission mode. The scheduler schedules the serving sub-cell of the UE 300 and the selected cooperative sub-cells in such a manner that all of the serving sub-cell and the cooperative sub-cells transmit the same signals in the same frequency area to the UE 300.

The selected cooperative sub-cells use the same VM Index (VMI).

In accordance with an embodiment of the present invention, if the scheduler sets the transmission mode for the UE 300 to the cooperative transmission mode, a precoding matrix is changed according to the VMs of the selected cooperative sub-cells. The cooperative sub-cells use the same precoding matrix, which will be described later in more detail.

If the UE 300 does not satisfy the above-described cooperative transmission mode condition, a Single Input Multiple Output (SIMO) transmission mode or a MIMO transmission mode may be set for the UE 300 according to a current channel state of the UE 300, irrespective of whether or not sub-cells transmit the same signals through their antennas. In this case, a sub-cell may transmit data to the UE and different data to another UE simultaneously through physical antennas connected to the sub-cell.

If each sub-cell transmits the same signal to the UE 300 through at least one antenna, the MIMO/SIMO transmission mode, the cooperative transmission mode, and the normal transmission mode may be set for the UE 300.

For example, when each of sub-cells transmits the same signal to the UE 300 through at least one antenna, if at least one of the sub-cells satisfies Equation (1), irrespective of the other CRS ports than a specific CRS port to which the same signal is input in each sub-cell, data pollution is likely to occur for data transmitted through the specific CRS ports of the sub-cells. Thereafter, the scheduler may set the SIMO transmission mode for the UE 300 so that each of the sub-cells may transmit data through the other CRS ports, except for the specific CRS port. In this case, the sub-cells may perform space-division transmission.

In another example, referring again to FIG. 3, if the difference between the measured strength $P_0$ of a signal received from serving sub-cell 0 and the measured strength $P_1$ of a signal received from sub-cell 1 satisfies Equation (2) below, the scheduler may set the MIMO transmission mode for the UE 300.

$$P_A - \mathrm{Max}(P_B) > P\_mimo\_th \quad (2)$$

In Equation (2), P_mimo_th is larger than the threshold signal strength difference at which data pollution occurs.

For example, if two data streams are transmitted to a UE for which the MIMO transmission mode is set, sub-cells may operate in both SIMO and MIMO.

The scheduler sets the SIMO transmission mode for a UE to which sub-cells not satisfying Equation (2) are to transmit signals. Each of the sub-cells transmits data through the other physical antenna, except for an antenna that transmits the same signal as the other sub-cells.

In summary, the scheduler has the following constraints in scheduling according to a transmission mode determined for a UE and the configurations of antennas connected to sub-cells associated with the UE.

If the cooperative transmission mode is set for a UE, the scheduler schedules cooperative sub-cells selected for the UE to transmit the same signals in resources required for the UE.

If the SIMO transmission mode is set for the UE, even though the UE requests two data streams and the UE is placed in a channel state that is good enough to receive two data streams, the scheduler restricts each sub-cell to transmit one data stream. A CRS port other than a CRS port shared with other sub-cells transmits one data stream in each sub-cell.

If the MIMO transmission mode is set for the UE, the scheduler may schedule each sub-cell to transmit one or two data streams according to the channel state and request of the UE.

Finally, if a transmission mode other than the cooperative transmission mode is set for the UE, the scheduler may schedule sub-cells having the same cell ID to transmit data traffic to UEs other than the UE in the same frequency resources.

Once a transmission mode is determined for a UE in the above-described manner, the scheduler determines a PM, in consideration of the VMs of sub-cells that are set based on VM information acquired from a higher layer.

Specifically, the scheduler determines a VM for each of the sub-cells forming a cell, based on the VM information acquired from the higher layer. The scheduler may assign different VMs to all of the sub-cells or the same VM to all or at least two of the sub-cells.

Table 1 illustrate VMs according to an embodiment of the present invention.

Referring to Table 1, it is assumed that a cell includes three sub-cells and the sub-cells use different VMs. Herein, i of $VM_i$ indicates an index of a sub-cell.

TABLE 1

$$VM_0 = \frac{1}{2}\begin{bmatrix} j & j & 1 & 1 \\ 1 & 1 & j & j \end{bmatrix}, \quad VM_1 = \frac{1}{\sqrt{2}}\begin{bmatrix} 0 & 1 & -j & 0 \\ j & 0 & 0 & -1 \end{bmatrix}, \quad VM_2 = \frac{1}{2}\begin{bmatrix} 1 & 1 & 1 & -1 \\ 1 & -1 & 1 & 1 \end{bmatrix}$$

Referring to again to FIG. 1, for convenience of description, the antenna mapper 108 pre-stores available VMs. If the antenna mapper 108 receives a VMI set for the sub-cell from the scheduler 101, the antenna mapper 108 selects a VM corresponding to the received VMI from among the available VMs, generates output signals by multiplying input signals by the VM, and provides the output signals to physical antennas associated with the VM.

In accordance with an embodiment of the present invention, the scheduler determines a PM for a sub-cell, referring to a table that maps available PMs to each predetermined VM.

Table 2 below lists PMs mapped to each VMI according to an embodiment of the present invention.

TABLE 2

|  | Rank 1 PMI | | Rank 2 PMI | |
| --- | --- | --- | --- | --- |
| subcell with VMI 0 | $P_{0,1}^{R1} = \frac{1}{2}\begin{bmatrix} 1 \\ 1 \\ -1 \\ 1 \end{bmatrix}$ | $P_{0,2}^{R1} = \frac{1}{2}\begin{bmatrix} 1 \\ j \\ 1 \\ j \end{bmatrix}$ | $P_{0,1}^{R2} = \frac{1}{2\sqrt{2}}\begin{bmatrix} 1 & -1 \\ 1 & 1 \\ -1 & 1 \\ 1 & 1 \end{bmatrix}$ | $P_{0,2}^{R2} = \frac{1}{2\sqrt{2}}\begin{bmatrix} 1 & -j \\ j & -1 \\ 1 & j \\ j & 1 \end{bmatrix}$ |
|  | (Rank 1 PMI #13) | (Rank 1 PMI #9) | (Rank 2 PMI #13) | (Rank 2 PMI #9) |
| subcell with VMI 1 | $P_{1,0}^{R1} = \frac{1}{2}\begin{bmatrix} 1 \\ 1 \\ -1 \\ 1 \end{bmatrix}$ | $P_{1,2}^{R1} = \frac{1}{2}\begin{bmatrix} 1 \\ -1 \\ 1 \\ -1 \end{bmatrix}$ | $P_{1,0}^{R2} = \frac{1}{2\sqrt{2}}\begin{bmatrix} 1 & -1 \\ 1 & 1 \\ -1 & 1 \\ 1 & 1 \end{bmatrix}$ | $P_{1,2}^{R2} = \frac{1}{2\sqrt{2}}\begin{bmatrix} 1 & -1 \\ -1 & 1 \\ 1 & 1 \\ -1 & -1 \end{bmatrix}$ |
|  | (Rank 1 PMI #13) | (Rank 1 PMI #2) | (Rank 2 PMI #13) | (Rank 2 PMI #2) |
| subcell with VMI 2 | $P_{2,0}^{R1} = \frac{1}{2}\begin{bmatrix} 1 \\ j \\ 1 \\ j \end{bmatrix}$ | $P_{2,1}^{R1} = \frac{1}{2}\begin{bmatrix} 1 \\ -1 \\ 1 \\ -1 \end{bmatrix}$ | $P_{2,0}^{R2} = \frac{1}{2\sqrt{2}}\begin{bmatrix} 1 & -j \\ j & -1 \\ 1 & j \\ j & 1 \end{bmatrix}$ | $P_{2,1}^{R2} = \frac{1}{2\sqrt{2}}\begin{bmatrix} 1 & -1 \\ -1 & 1 \\ 1 & 1 \\ -1 & -1 \end{bmatrix}$ |
|  | (Rank 1 PMI #9) | (Rank 1 PMI #2) | (Rank 2 PMI #9) | (Rank 2 PMI #2) |

Referring to Table 2, it is assumed that a cell has three sub-cells and each sub-cell uses a different VM, as illustrated in Table 1, and VMI 0, VMI 1, and VM 2 are indexes of the respective VMs, $VM_0$, $VM_1$, and $VM_2$ of Table 1.

As shown in Table 2, if available PMI are determined for each sub-cell, the scheduler changes a precoding matrix for the sub-cell according to the VMI of the sub-cell.

Specifically, Table 3 below lists exemplary PMIs determined according to the VMIs of the sub-cells. In Table 3, a PMI is determined for a UE for which the cooperative transmission mode is set, based on the VMIs of cooperative sub-cells selected for a serving sub-cell. For other transmission modes, other tables may be created, which map PMIs to VMs of sub-cells according to the present invention.

TABLE 3

|  | v_p = 0 | v_p = 1 | v_p = 2 |
|---|---|---|---|
| v_m = 0 | NA | 13 | 9 |
| v_m = 1 | 13 | NA | 2 |
| v_m = 2 | 9 | 2 | NA |

In Table 3, v_m indicates the VMI of a serving sub-cell and v_p indicates the VMI of a cooperative sub-cell selected to cooperate with the serving sub-cell. Values listed in Table 3 indicate PMIs, and NA (Not Available) means that no PMI is available.

Referring again to Table 2, PMI #13 and PMI #9 are available to a sub-cell to which VMI 0 is allocated, among the three sub-cells. Specifically, Table 2 shows matrices corresponding to PMI #13 and PMI #9 for rank 1 (i.e., one data transmission stream) and rank 2 (i.e., two data transmission streams). PMI #13 and PMI #2 are available for a sub-cell to which VMI 1 is allocated.

Table 2 shows matrices corresponding to PMI #13 and PMI #2 for rank 1 (i.e., one data transmission stream) and rank 2 (i.e., two data transmission streams). PMI #9 and PMI #2 are available for a sub-cell to which VMI 2 is allocated.

Table 2 shows matrices corresponding to PMI #9 and PMI #2 for rank 1 (i.e., one data transmission stream) and rank 2 (i.e., two data transmission streams).

Upon receipt of information about a VM allocated to the serving sub-cell of the UE from the higher layer, the scheduler provides a VMI corresponding to the VM to the antenna mapper. Thereafter, the scheduler receives information about the strengths of signals received from neighbor sub-cells of the serving sub-cell and determines whether there is any cooperative sub-cell satisfying Equation (3).

For example, if there is a cooperative sub-cell satisfying Equation (3), the scheduler determines the cooperative transmission mode for the UE. Thereafter, the scheduler selects a predetermined PMI according to the VMI of the cooperative sub-cells and the VMI of the serving sub-cell of the UE, as shown in Table 2, from among PMIs available to each sub-cell to which a VMI is allocated, as shown in Table 3.

Specifically, referring to Table 3, if the VMI (v_m) of the serving sub-cell of the UE is '0', the scheduler checks the VMI (v_p) of the cooperative sub-cell. If the VMI (v_p) of the cooperative sub-cell is '0', the scheduler selects 'NA'. If the VMI (v_p) of the cooperative sub-cell is '1', the scheduler selects 'PMI #13'. If the VMI (v_p) of the cooperative sub-cell is '2', the scheduler selects 'PMI #9'.

Further, if the VMI (v_m) of the serving sub-cell of the UE is '1', the scheduler checks the VMI (v_p) of the cooperative sub-cell. If the VMI (v_p) of the cooperative sub-cell is '0', the scheduler selects 'PMI #13'. If the VMI (v_p) of the cooperative sub-cell is '1', the scheduler selects 'NA'. If the VMI (v_p) of the cooperative sub-cell is '2', the scheduler selects 'PMI #2'.

Finally, if the VMI (v_m) of the serving sub-cell of the UE is '2', the scheduler checks the VMI (v_p) of the cooperative sub-cell. If the VMI (v_p) of the cooperative sub-cell is '0', the scheduler selects 'PMI #9'. If the VMI (v_p) of the cooperative sub-cell is '1', the scheduler selects 'PMI #2'. If the VMI (v_p) of the cooperative sub-cell is '2', the scheduler selects 'NA'.

As described above, for a UE for which the cooperative transmission mode is set, a PMI is determined based on the VMIs of a serving sub-cell and cooperative sub-cells. Herein, the cooperative sub-cells use the same determined PMI.

Figure 4:
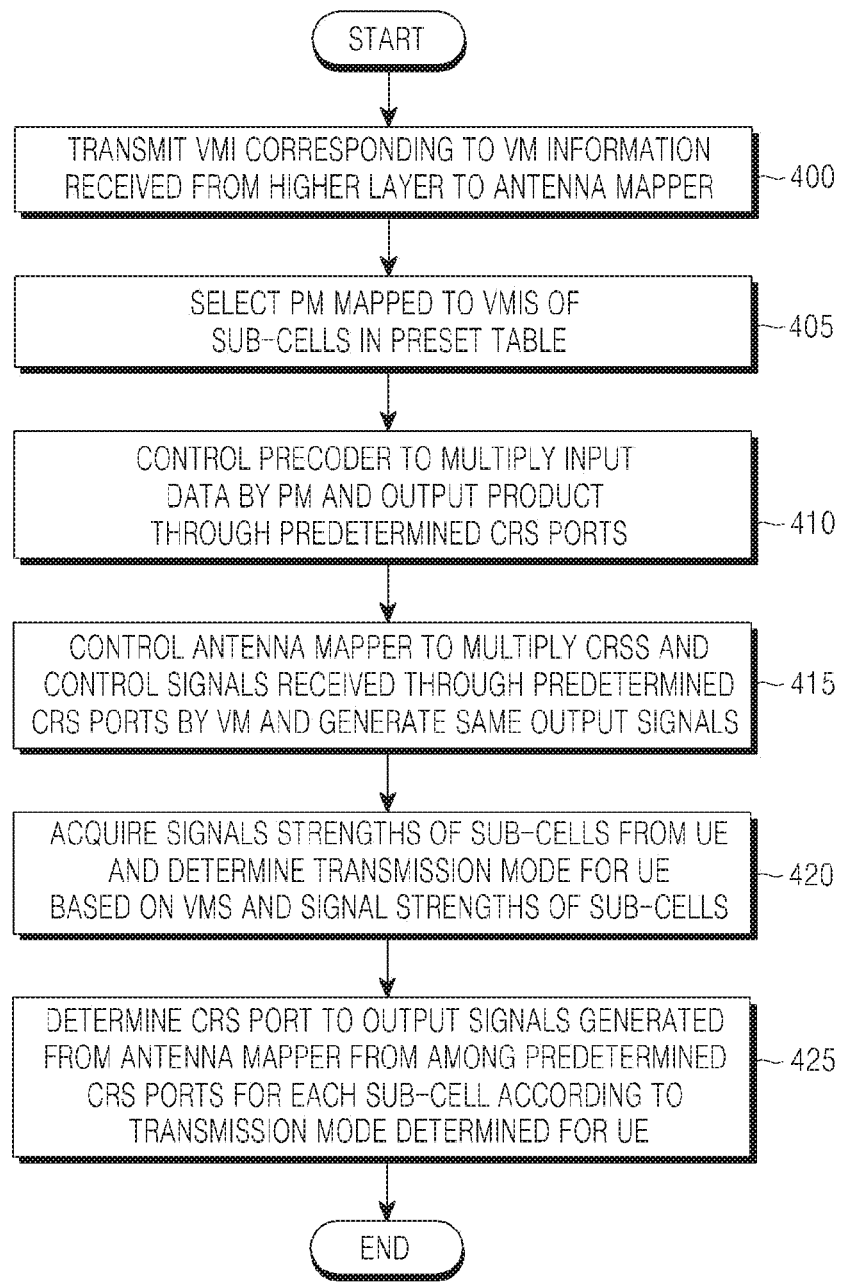
FIG. 4 is a flowchart illustrating an operation of a scheduler according to an embodiment of the present invention.

FIG. 4 is a flowchart illustrating an operation of a scheduler according to an embodiment of the present invention.

Referring to FIG. 4, in step 400, the scheduler acquires information about a VM set for each of sub-cells from a higher layer, determines the VMs of the sub-cells based n the VM information, and transmits a VMI indicating the VM of each of the sub-cells to an antenna mapper associated with the sub-cell.

In step 405, the scheduler selects PMs mapped to the VMIs of the sub-cells from a preset table.

In step 410, the scheduler controls a precoder associated with the sub-cell to multiply input data by the PM of the sub-cell and to output the product through a predetermined CRS port.

In step 415, the scheduler controls the antenna mapper to generate the same output signals by multiplying CRSs and control signals received through CRS ports by the VM of the sub-cell.

In step 420, the scheduler acquires information about the strengths of signals that each UE receives from the sub-cells and then determines a transmission mode for a specific UE, based on the VM and received signal strength of each sub-cell.

In step 425, the scheduler determines a CRS port through which an output signal of the antenna mapper is output from among the predetermined CRS ports, on a sub-cell basis according to the transmission mode of the UE.

Alternatively, the sequence of the steps in FIG. 4 may be changed. For example, while FIG. 4 illustrates that PMs are selected according to determined VMs and then a transmission mode is determined based on received signal strengths, if a transmission mode is preset, VMs and PMs may be selected according to the preset transmission mode.

Subsequently, data is transmitted through a physical antenna mapped to each of the determined CRS ports on a sub-cell basis.

Figure 5:
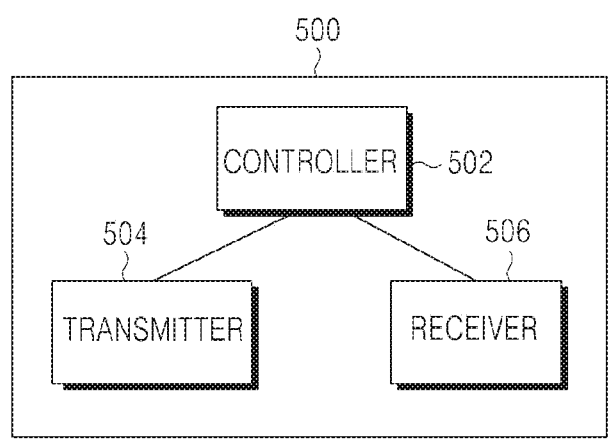
FIG. 5 is a block diagram illustrating a UE according to an embodiment of the present invention.

FIG. 5 is a block diagram illustrating a UE according to an embodiment of the present invention. Specifically, FIG. 5 illustrates a UE is located in one of a plurality of sub-cells in a multi-cellular wireless communication system.

Referring to FIG. 5, a UE 500 includes a controller 502, a transmitter 504, and a receiver 506. The controller 502 generates UL control information and controls transmission of the UL control information to a TP through the transmitter 504.

The receiver 506 receives a signal transmitted through a VM corresponding to a sub-cell according to a transmission mode determined based on the UL control information. TPs have already determined VMs of their sub-cells and PMs corresponding to the VMs.

As described above, transmission modes include a cooperative transmission mode and a normal transmission mode. In the cooperative transmission mode, one or more sub-cells having signal strengths that differ from the signal strength of a serving sub-cell by a certain threshold or less transmit DL signals in the same frequency resources to a UE. In the normal transmission mode, only the serving sub-cell transmits a DL signal to the UE.

A VM is determined for each of the plurality of sub-cells according to the number of antennas connected to the sub-cell and the number of paths in which signals of the sub-cell are input in a TP of the sub-cell.

A PM corresponding to the VM is determined according to the number of input data and the number of paths in which signals of the sub-cell are input in the TP.

In the cooperative transmission mode, a different PM is mapped to each of one or more sub-cells according to the VM of the serving sub-cell of the UE. The same or different VMs may be set for the plurality of sub-cells. A DL signal and control signal of each of the sub-cells have the same strength and phase.

As is apparent from the description above, in accordance with an embodiment of the present invention, a signal is transmitted in each of a plurality of sub-cells through a plurality of antennas in a wireless communication system in which a cell includes a plurality of sub-cells sharing a control channel. As a result, inter-cell interference is minimized and data transmission efficiency is increased in the wireless communication system.

As described above, certain embodiments of the present invention typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the above-described embodiments of the present invention. Alternatively, one or more processors operating in accordance with stored instructions may implement the functions associated with the above-described embodiments of the present invention. If such is the case, it is within the scope of the present disclosure that such instructions may be stored on one or more processor readable mediums. Examples of a processor readable medium includes a Read-Only Memory (ROM), a Random-Access Memory (RAM), a Compact Disc-ROM (CD-ROM), a magnetic tape, a floppy disk, and an optical data storage device. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for performing wireless communication in a cell including a first sub-cell and a second sub-cell, comprising:
    applying a precoding matrix and a first virtual matrix to a first data input for generating a first downlink signal;
    applying the precoding matrix and a second virtual matrix to a second data input for generating a second downlink signal;
    transmitting the first downlink signal to a terminal using first antenna ports for the first sub-cell; and
    transmitting the second downlink signal to the terminal using second antenna ports for the second sub-cell.

2. The method of claim 1, wherein the first virtual matrix and the second virtual matrix are different.

3. The method of claim 1, wherein the first sub-cell and the second sub-cell share a control channel.

4. The method of claim 1, wherein cell identifiers of the first sub-cell and the second sub-cell are the same.

5. The method of claim 1, wherein each of the first downlink signal and the second downlink signal includes at least one common reference signal (CRS).

6. The method of claim 1, wherein the precoding matrix is selected from among a set of precoding matrices, and
    the first virtual matrix and the second virtual matrix are selected from among a set of virtual matrices.

7. A base station for performing wireless communication in a cell including a first sub-cell and a second sub-cell, comprising:
    a transceiver; and
    a controller coupled to the transceiver, wherein the controller is configured to:
        apply a precoding matrix and a first virtual matrix to a first data input for generating a first downlink signal;
        apply the precoding matrix and a second virtual matrix to a second data input for generating a second downlink signal;
        transmit the first downlink signal to a terminal using first antenna ports for the first sub-cell; and
        transmit the second downlink signal to the terminal using second antenna ports for the second sub-cell.

8. The base station of claim 7, wherein the first virtual matrix and the second virtual matrix are different.

9. The base station of claim 7, wherein the first sub-cell and the second sub-cell share a control channel.

10. The base station of claim 7, wherein cell identifiers of the first sub-cell and the second sub-cell are the same.

11. The base station of claim 7, wherein each of the first downlink signal and the second downlink signal includes at least one common reference signal (CRS).

12. The base station of claim 7, wherein the precoding matrix is selected from among a set of precoding matrices, and
    the first virtual matrix and the second virtual matrix are selected from among a set of virtual matrices.

* * * * *